3,689,432
EMULSION COPOLYMERIZATION INITIATOR
Ellsworth E. Faust, Berkeley Heights, N.J., assignor to Celanese Corporation, New York, N.Y.
No Drawing. Filed Mar. 31, 1971, Ser. No. 130,028
Int. Cl. C08f 15/02
U.S. Cl. 252—428           1 Claim

ABSTRACT OF THE DISCLOSURE

A specific initiation system of hydrogen peroxide-zinc formaldehyde sulfoxalate/t-dodecyl mercaptan provides high conversion levels in vinyl acetate/alpha-olefin emulsion copolymerization reactions.

BACKGROUND OF THE INVENTION

This invention relates to the production of copolymers from vinyl acetate and alpha-olefins. More particularly, it relates to a novel catalyst system for improving the conversion levels in vinyl acetate/alpha-olefin emulsion copolymerization reactions.

Aqueous emulsions containing various copolymers derived from vinyl acetate and alpha-olefins have been known for many years. The procedures used to prepare these copolymer emulsions generally involve adding, with rapid stirring, one or more of the appropriate ethylenically unsaturated monomers to water which contains or to which is added, either simultaneously or subsequently, surfactants or emulsifying agents, a polymerization catalyst or initiator such as the conventional system of persulfate/metabisulfite/ferrous sulfate, and in many cases, a protective colloid-forming substance. This reaction mixture is then heated to polymerization temperature with continued stirring and held at that temperature until substantially complete polymerization of the monomers has occurred. The resulting vinyl acetate/alpha-olefin copolymer emulsions, upon cooling and filtering, can be used in many domestic and industrial applications, such as in paints or other coating compositions (e.g., paper coatings and textile-treating agents), in adhesives or binders, in caulking compositions, and the like, depending on the particular polymers involved and the properties of the emulsions containing them.

However, one difficulty heretofore associated with polymer emulsions, in general is that it has not been possible, within the limits of economic feasibility, to conduct the emulsion copolymerization of vinyl acetate with alpha-olefins at conversions approaching 100 percent of the theoretical to the degree desired.

Therefore, it is an object of the present invention to provide a means for conducting the emulsion copolymerization of vinyl acetate with alpha-olefins at higher rates of conversion than was heretofore generally possible.

This and other objects of the present invention as well as a fuller understanding of the advantages thereof can be had by reference to the following detailed description and claim.

SUMMARY OF THE INVENTION

The above objects are achieved according to the present invention by the use of a novel catalyst system for the copolymerization of vinyl acetate with one or more alpha-olefins. Specifically, it has been discovered that the system comprising hydrogen peroxide, zinc formaldehyde sulfoxalate, and t-dodecyl mercaptan provides high conversion levels in vinyl acetate/alpha-olefin emulsion copolymerization reactions.

It is a feature of the present invention that each of the three initiator components is required for maximum conversion of monomers to copolymer. Significantly lower conversions will result when the tertiary-dodecyl mercaptan is eliminated, when the zinc formaldehyde sulfoxalate is eliminated or replaced by the corresponding sodium salt, and when the hydrogen peroxide component is replaced by persulfate.

The tertiary-dodecyl mercaptan is commercially available from Phillips Petroleum Corporation, Bartlesville, Okla. The zinc formaldehyde sulfoxalate is available from Diamond Shamrock Corporation, Napco Chemicals Division, Newark, N.J., under the name "Hydrozin." The relative proportions of tertiary-dodecyl mercaptan, zinc formaldehyde sulfoxalate, and hydrogen peroxide required according to the present invention are respectively, between 0.5 and 1.5 parts by weight, between 7 and 8 parts by weight, and between 4 and 6 parts by weight. Preferably, the ratio of the aforementioned three catalyst components is 1:7.5:5/tertiary-dodecyl mercaptan:zinc formaldehyde sulfoxalate: hydrogen peroxide. The total amount of the tertiary-dodecyl mercaptan/zinc formaldehyde sulfoxalate/hydrogen peroxide system used in the present invention is in accordance with general practice, generally no more than that required to obtain substantially complete conversion of monomer to copolymer at lowest catalyst cost. Desirably, the aforementioned catalyst system is used in a total amount of between about 0.5 and about 5 percent by weight based on the total weight of the monomer charge, with between about 1 and about 3 percent being especially preferred.

Copolymers which can be produced according to the present invention are derived from vinyl acetate and one or more alphaolefins. Typical alpha-olefins suitable for use according to the present invention include straight-chain and branched-chain olefins containing between 2 carbon atoms (e.g., ethylene) and about 20 carbon atoms (e.g., 1 - eicosene). These alpha-olefins can be unsubstituted or substituted, provided the substituents, if any, are inert under the intended polymerization conditions. Preferred alpha-olefins are straight-chain unsubstituted olefins containing bewteen 5 and 10 carbon atoms, viz, pentene-1, hexene-1, heptene-1, and octene-1, nonene-1, and decene-1.

The polymerization procedure of the invention can involve the use of one or more micelle-forming surfactants of the same type as employed in conventional emulsion polymerization techniques.

Among the non-ionic surfactants suitable for use in the present invention are polyethers, e.g., ethylene oxide and propylene oxide condensates in general, which include straight- and branched-chain alkyl and alkylaryl polyethylene glycol ethers and thioethers and polypropylene glycol ethers and thioethers and polypropylene glycol ethers and thioethers, and more particularly substances such as the "Igepals," which is a trademark of General Aniline and Film Corporation denoting members of a homologous series of alkylphenoxypoly-(ethyleneoxy)

ethanols, which series can be represented by the general formula:

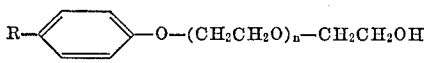

wherein R represents an alkyl substituent and $n$ represents the number of moles of ethylene oxide employed. These non-ionic surfactants include alkylphenoxypoly-(ethyleneoxy)ethanols having alkyl groups containing between about 4 to about 240 ethyleneoxy units such as the heptylphenoxypoly(ethyleneoxy)ethanols, nonylphenoxypoly(ethyleneoxy)ethanols and dodecylphenoxypoly (ethyleneoxy)ethanols. Other suitable non-ionic surfactants are the "Tweens," which is a trademark of Atlas Powder Company denoting polyoxyalkylene derivatives of hexitol (including sorbitans, sorbides, mannitans and mannides) anhydride, partial long chain fatty acid esters, such as the polyoxyalkylene derivatives of sorbitan monolaurate, sorbitan monopalmitate, sorbitan monostearate, sorbitan tristearate, sorbitan monopalmitate, sorbitan monostearate, sorbitan tristearate, sorbitan monooleate and sorbitan trioleate; the "Pluronics," which is a trademark of Wyandotte Chemicals Corporation denoting condensates of ethylene oxide with a hydrophobic base, said base being formed by condensing propylene oxide with propylene glycol; sulfur-containing condensates, e.g., those prepared by condensing ethylene oxide with propylene glycol; sulfur-containing condensates, e.g., those prepared by condensing ethylene oxide with higher alkyl mercaptans, such as nonyl, dodecyl, or tetradecyl mercaptan, or with alkylthiophenols wherein the alkyl substituent contains from 6 to 15 carbon atoms; ethylene oxide derivatives of long-chain carboxylic acids such as lauric, myristic, palmitic or oleic acid, or mixtures of acids, such as tall oil, and ethylene oxide derivatives of long-chain alcohols such as octyl, decyl, lauryl or cetyl alcohol.

Among the anionic surfactants suitable for use in the present invention are the higher molecular weight sulfates and sulfonates, e.g., sodium and potassium alkyl sulfates, aryl sulfates, and alkylaryl sulfates and sulfonates, including sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate and sodium xylene sulfonate; higher fatty alcohols, e.g., stearyl alcohol, lauryl alcohol, and the like, which have been ethoxylated and sulfonated; dialkyl esters of alkali metal sulfosuccinic acid salts, e.g., sodium dioctyl sulfosuccinate; and formaldehyde-napthalenesulfonic acid condensation products.

Aside from the surfactant or surfactant mixture employed, the monomer pre-emulsion material to be used in making the pre-emulsion can also contain small amounts of one or more protective colloids. Included among such materials are either linkage-containing protective colloids, such as hydroxymethyl cellulose, hydroxyethyl cellulose, ethylhydroxyethyl cellulose, carboxymethyl cellulose, ethoxylated starch derivatives and the like. However, other protective colloid-forming substances, i.e., containing no ether linkage can also be used either alone or together with the aforementioned ether linkage containing materials, and included among these are partially and fully hydrolyzed polyvinyl alcohols, polyacrylic acid, sodium and other alkali metal polyacrylates, polyacrylamide, poly(methylvinyl ether/maleic anhydride)polyvinylpyrrolidone, water - soluble starch, glue, gelatin, water-soluble alginates such as sodium or potassium alginate, casein, agar, and natural and synthetic gums, such as gum arabic and gum tragacanth. All of these materials can be used in amounts conventionally used in emulsion polymerization procdeures, i.e., in amounts usually ranging from about 0.1% to about 2% by weight of the polymer emulsion.

No particular elevated or lowered temperature or temperature range is required when preparing the copolymer emulsions of the present invention. In fact, in most of the emulsion copolymerization reactions performed according to the present invention, the polymerization temperature will generally range from about room temperature (i.e., so-called "ambient temperature") or lower to about 80° C. or above. Preferably, temperatures from about 20° C. to about 60° C. are used. This temperature can be varied as the polymerization proceeds toward substantial completion. Sub-atmospheric, atmospheric, or superatmospheric pressures can be employed during all or part of the polymerization. Further, the reaction can be carried out, if desired, under an inert atmosphere, e.g., under an atmosphere of nitrogen, argon, or carbon dioxide.

DESCRIPTION OF PREFERRED EMBODIMENTS

The following examples are presented for the purpose of illustrating the present invention. It is understood, however, that numerous variations in the following procedures can be made without departing from the spirit and scope of this invention as disclosed and defined herein.

EXAMPLE I

A pre-emulsion is first formed by adding, with vigorous agitation, a mixture of 459 grams vinyl acetate, 51 grams hexene-1, and 0.5 gram t-dodecyl mercaptan to 249 grams water containing 30.7 grams Igepal CO–977, 12.0 grams Igepal CO–430, and 1.0 gram sodium bicarbonate.

The pre-emulsion formed above is placed into a calibrated addition funnel.

Solutions are prepared of 8.3 grams 30 percent hydrogen peroxide in 43 grams water, and 3.8 grams zinc formaldehyde sulfoxylate in 75 grams water. These two solutions are likewise placed into separate calibrated addition funnels.

To a 2-liter reaction vessel is charged 75 grams water, which is then sparged with nitrogen and heated to 35° C. Then 5 grams of the hydrogen peroxide solution and 7.5 grams of the zinc formaldehyde sulfoxylate solution are added, and the delayed addition of the pre-emulsion and the remainder of the catalyst and activator solutions is begun. Delayed addition is continued at a uniform rate over a 4-hour period. After the delay period, the reaction is held at 35° C. for an additional ½ hour, and then cooled.

The resulting latex has a solids content of 49 percent out of a theoretical 55 percent.

EXAMPLE II

The polymerization procedure followed in this example is identical to that in Example I, above, except that the t-dodecyl mercaptan is omitted. The resulting latex has a solids content of only 44.8 percent.

EXAMPLE III

The polymerization procedure followed in this example is identical to that in Example I, above, except that the hydrogen peroxide is replaced by 4 grams sodium persulfate. The resulting latex has solids content of only 12.5 percent.

EXAMPLE IV

The polymerization procedure followed in this example is identical to that in Example I, except that the monomer charge is 454.4 grams vinyl acetate, 50.5 grams hexene-1, and 5.1 grams acrylic acid. The latex has a total solids content of 46.1 percent.

EXAMPLE V

The polymerization procedure followed in this example is identical to that in Example IV except that sodium formaldehyde sulfoxylate is used instead of the corresponding zinc salt. The resulting latex has a solids content of only 31.7 percent.

EXAMPLE VI

The polymerization procedure followed in this example is identical to that in Example IV, except that the zinc formaldehyde sulfoxylate is omitted and the t-dodecyl mercaptan level is increased to 2.0 grams. The latex has a solids content of only 9.5 percent.

I claim:

1. A catalyst system for the copolymerization of vinyl acetate with an alpha-olefin, said catalyst system comprising:
   (a) between 0.5 and 1.5 parts by weight of tertiary-dodecyl mercaptan;
   (b) between 7 and 8 parts by weight of zinc formaldehyde sulfoxalate; and
   (c) between 4 and 6 parts by weight hydrogen peroxide.

References Cited

UNITED STATES PATENTS

| | | | |
|---|---|---|---|
| 3,317,495 | 5/1967 | Jones et al. | 252—428 X |
| 3,222,328 | 12/1965 | La Combe et al. | 252—428 X |
| 3,366,605 | 1/1968 | Seiner | 252—428 X |

PATRICK P. GARVIN, Primary Examiner

U.S. Cl. X.R.

260—87.3